(12) United States Patent
Pinello et al.

(10) Patent No.: US 10,534,889 B2
(45) Date of Patent: Jan. 14, 2020

(54) DETERMINING ECO AGGRESSOR NETS DURING INCREMENTAL EXTRACTION

(71) Applicant: Synopsys, Inc., Mountain View, CA (US)

(72) Inventors: William Pinello, Phoenix, AZ (US); Arthur Nieuwoudt, Mountain View, CA (US); Mathieu Drut, San Jose, CA (US); Beifang Qiu, Saratoga, CA (US)

(73) Assignee: SYNOPSYS, INC., Mountain View, CA (US)

( * ) Notice: Subject to any disclaimer, the term of this patent is extended or adjusted under 35 U.S.C. 154(b) by 106 days.

(21) Appl. No.: 15/163,628

(22) Filed: May 24, 2016

(65) Prior Publication Data
US 2016/0350470 A1 Dec. 1, 2016

Related U.S. Application Data

(60) Provisional application No. 62/167,200, filed on May 27, 2015.

(51) Int. Cl.
*G06F 17/50* (2006.01)
(52) U.S. Cl.
CPC ...... *G06F 17/5081* (2013.01); *G06F 17/5009* (2013.01); *G06F 2217/82* (2013.01)
(58) Field of Classification Search
CPC ............. G06F 17/5009; G06F 17/5081; G06F 2217/82

USPC .................... 716/113, 106, 111, 136; 703/15
See application file for complete search history.

(56) References Cited

U.S. PATENT DOCUMENTS

| 7,359,843 B1* | 4/2008 | Keller | G06F 17/5031 703/19 |
| 2009/0307645 A1* | 12/2009 | Buck | G06F 17/5036 716/115 |
| 2015/0199466 A1* | 7/2015 | Basu | G06F 17/5081 716/115 |
| 2017/0122998 A1* | 5/2017 | Liu | G06F 17/5031 |

* cited by examiner

*Primary Examiner* — Phallaka Kik
(74) *Attorney, Agent, or Firm* — Alston & Bird LLP (57) ABSTRACT

A computer-implemented method of extracting parasitics associated with a circuit design layout generated by modifying a previous iteration of the layout, includes, in part, identifying a first multitude of nets that have been changed in the circuit design layout relative to the previous iteration of the circuit design layout. The method further includes, in part, calculating a first multitude of parasitic capacitance values between each of the first multitude of first nets and each of a second multitude of nets disposed in proximity of the first multitude of nets. The method further includes, in part, identifying each net in the second multitude of nets as an aggressor net if a number defined by the net's associated parasitic capacitance value is higher than a threshold value. The method further includes excluding nets in the second multitude of second nets that are not identified as aggressor nets from the parasitic extraction.

12 Claims, 9 Drawing Sheets

FIG. 1A

PRIOR ART

FIG. 1B

PRIOR ART

FIG. 2A

PRIOR ART

FIG. 2B

PRIOR ART

DETERMINING ECO AGGRESSOR NETS DURING INCREMENTAL EXTRACTION

CROSS REFERENCE TO RELATED APPLICATIONS

This Application claims the benefit of priority under 35 USC 119(e) to U.S. Provisional Application No. 62/167,200, filed May 27, 2015, entitled "DETERMINING ECO AGGRESSOR NETS DURING INCREMENTAL EXTRACTION BACKGROUND", the contents of which are incorporated herein by reference in their entirety.

FIELD OF THE INVENTION

The present invention relates to Integrated Circuits, and more particularly to extracting parasitics from a layout of an IC.

BACKGROUND OF THE INVENTION

Full-chip electrical parasitic extraction of on-chip metal wires using an electronic design automation (EDA) tool is an important step in the design of an integrated circuit (IC). Depending on the designer's preference for accuracy or efficiency, either an implementation-level or a signoff-level parasitic extraction is performed. Implementation-level extractors may be typically 2 to 5 times faster than signoff-level extractors, but their accuracy may be, for example, 2 to 3 times worse.

In addition to decreased overall accuracy, implementation-level extractors typically lack proper support for a number of advanced process effects or layout attributes. One such attribute may be a floating metallization added to ensure uniformity of layout density and adequate layer planarization. Implementation-level extractors may approximate floating metallization as grounded conductors, thus further compromising their accuracy. Signoff-level parasitic extractors may provide an accuracy to within a few percent of silicon measurements or reference field solver data. In order for an EDA tool to satisfy signoff requirements, ideally it should provide a high degree of accuracy over many technology nodes and possible layout styles. This poses a challenging task since for every new process technology, new process effects need to be supported by signoff-level extractors.

Parasitic extraction software are further classified as providing either a full or incremental extraction. A full extraction process involves characterization of all objects or nets disposed in the IC. Conversely, incremental extraction only characterizes nets that have changed since the last iteration in the design process. An incremental extraction may be typically 2 to 10 times faster than a full extraction for a layout change of, for example, 1 to 5%. The efficiency of incremental extractors is important since they are typically bundled as part of a place and route and other tools operating in an incremental and faster mode. Conventional incremental extractors provide minimum runtime benefit and have a significantly degraded accuracy when used during a signoff process. The output of a parasitic extraction tool is often used by a downstream tool to estimate, for example, the performance, power consumption, and reliability of the IC design.

The following is a definition of a number of terms used in the present application:

| Term | Definition |
| --- | --- |
| Place & route (P&R) system: | Software that facilitates the automated placement and routing of an integrated circuit (IC) |
| Layout: | Topology of metal interconnections |
| Parasitic Extraction: | Calculation of interconnect parasitic effects in the form of resistance, inductance, and capacitance |
| Implementation Mode; | Faster, less accurate mode used for analysis in early stages of P&R design process |
| Signoff Mode: | Relatively slower, more accurate mode used for analysis in later stages of P&R design process |
| ECO | Engineering change order (ECO) describing a single physical change to a design |
| Victim Net | A single metal interconnection providing connectivity between a set of inputs and outputs |
| Aggressor Net | Any net whose existence influences the parasitics of one or more victim nets |
| ECO Net | Any net whose topology has changed in successive design iterations |
| ECO Affected Net | Any net whose parasitics are changed due to its proximity to one or more ECO nets |
| Placeholder Net | Any net whose topology is not changed and has minimal or no coupling to an ECO net |
| Full extraction | Parasitic extraction of all nets contained within an IC |
| Incremental extraction | Parasitic extraction of only ECO and ECO affected nets |

Figure 1A:
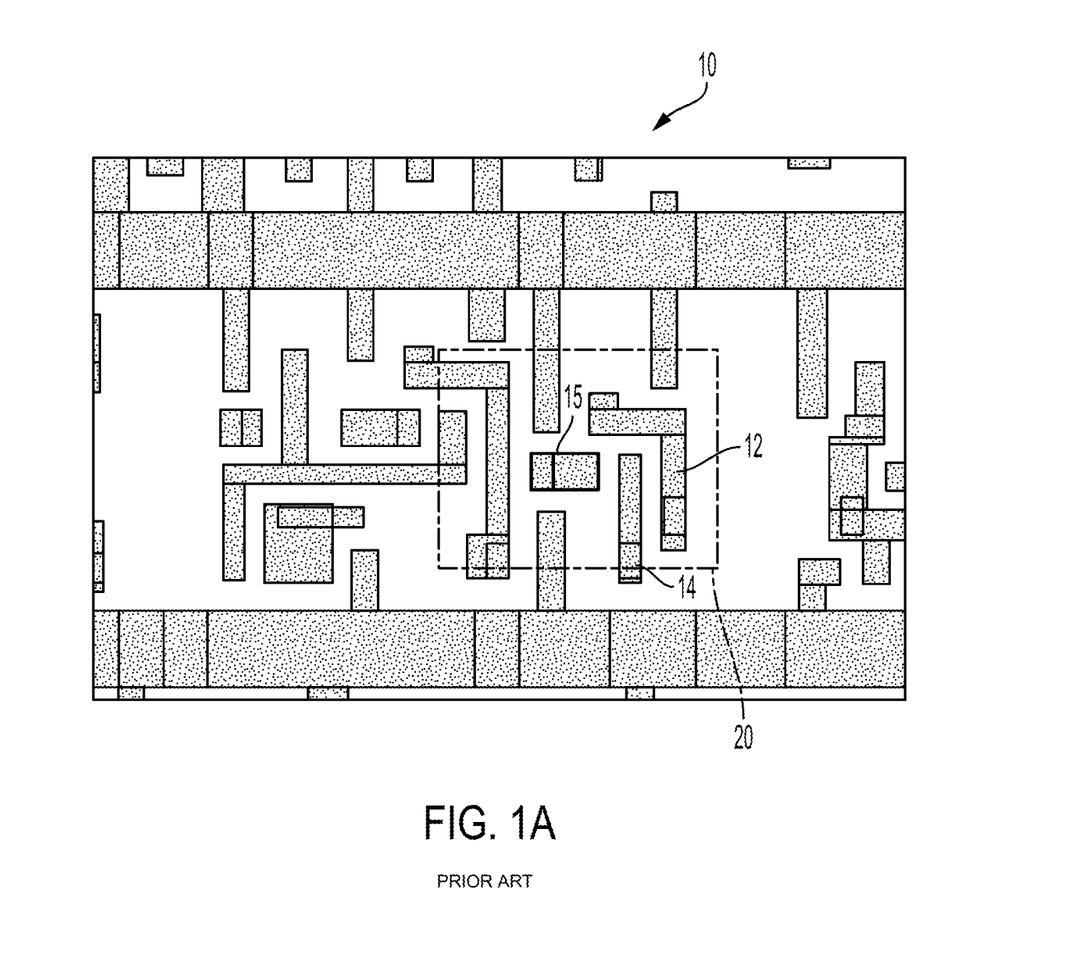
FIG. 1A is a partial view of a number of metal interconnects disposed in the same layer of an IC layout.
Figure 1B:
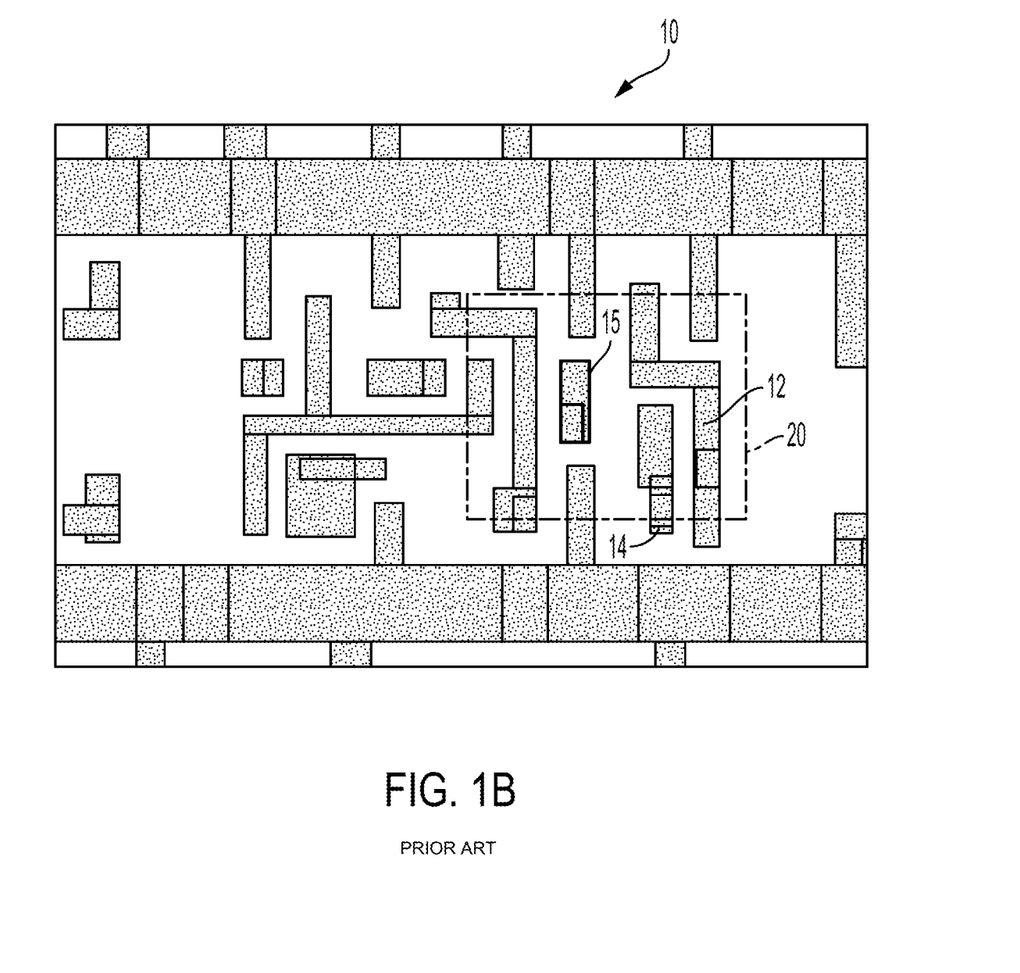
FIG. 1B is the partial view of the metal interconnects of FIG. 1A after the inclusion of a buffer in a region of the layout to resolve a violation identified during static timing analysis.

Conventional techniques for providing incremental extraction solution involve expanding the area in which the change has occurred by a predefined distance to form a region that surrounds the change, referred to herein as the halo region. FIG. 1A is a partial view of a number of metal interconnects disposed in the same layer in layout 10 of an IC. FIG. 1B is the partial view of the same metal interconnects in layer after the inclusion of a buffer in region 15 to resolve a violation identified during static timing analysis. The rectangles or polygons corresponding to non-ECO nets disposed in region 15 define the extent of ECO affected nets. As is seen by comparing FIGS. 1A and 1B, to accommodate the inclusion of the buffer, changes are made in metal interconnects 12 and 14. Consequently, although the changes are localized, a relatively small change in one polygon can result in the addition of many ECO affected nets.

Figure 2A:
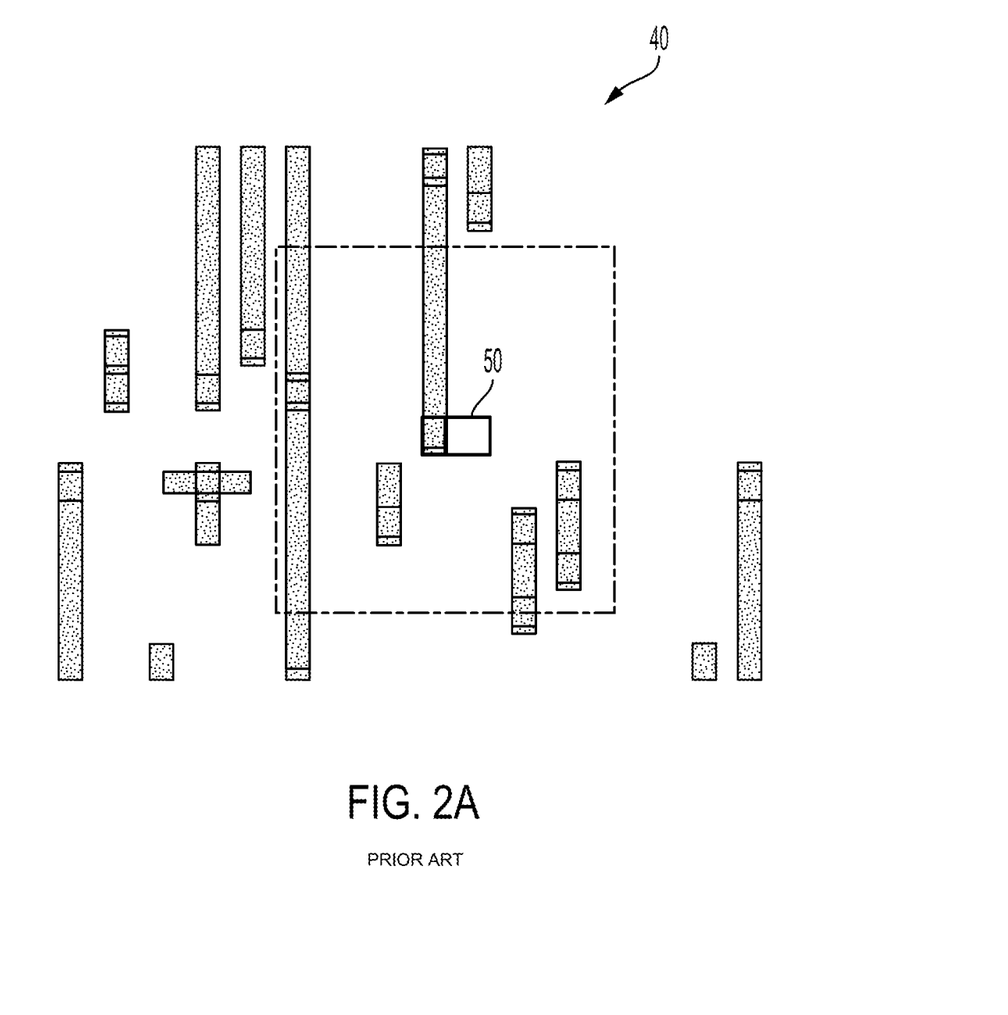
FIG. 2A is a partial view of a number of metal interconnects disposed in a layer of an IC layout.
Figure 2B:
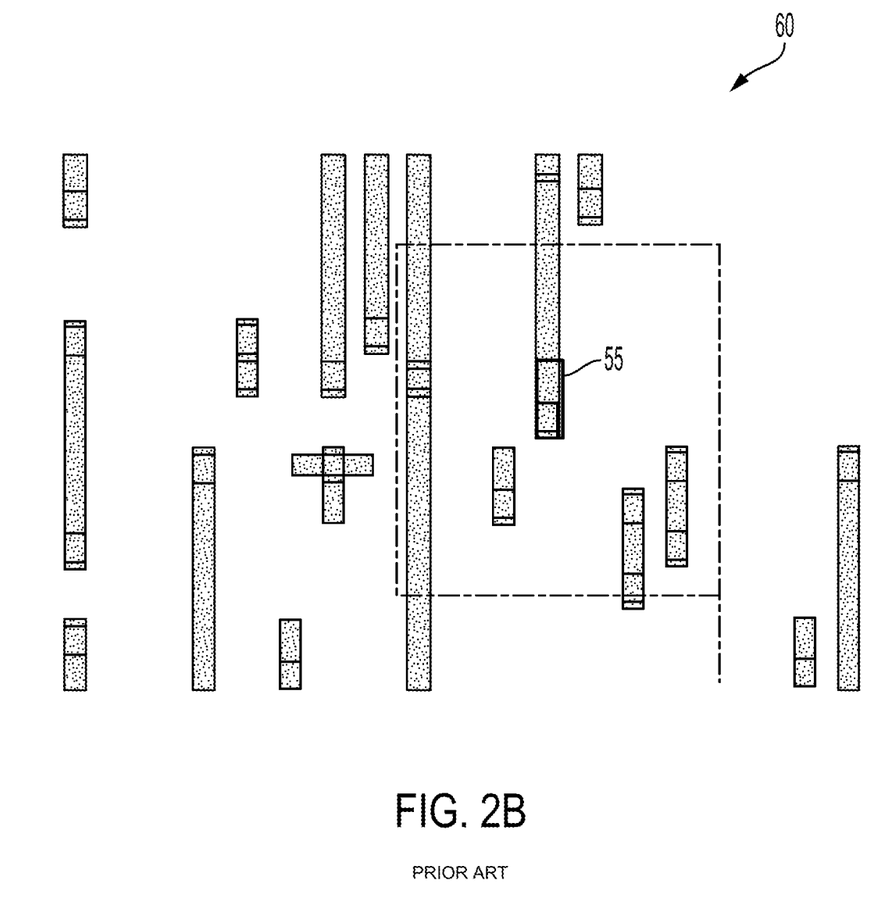
FIG. 2B is the partial layout view of another metal layer of the layout shown in FIG. 2A.

An IC is often fabricated using a multi-layer (e.g., 10 layers) process. To maintain signoff-level accuracy, the effect that the changes in one layer may cause on other layers need to be considered. FIG. 2A is a partial view of a number of metal interconnects disposed in a layer 40 of an IC. Assume that a number of interconnect changes are made in region 50 of FIG. 2A. FIG. 2B is the partial layout view of another metal layer 50 of the IC shown in FIG. 2A. Changes made to the metal interconnects in region 50 of layer 40 of FIG. 2A are shown as causing changes in region 55 of layer 60 of FIG. 2B. Accordingly, FIGS. 2A and 2B show the impact the metal interconnect change in one layer can cause in the metal interconnects of another layer. As each layer-to-layer interaction is accounted for, the number of aggressor nets impacted can grow dramatically even from a relatively small topological change.

To limit the number of aggressor nets, simplifications need to be made. Such simplification include, for example, reducing the size of the halo region, or restricting/eliminating cross layer checking. Such simplifications while reducing the runtime, severely impact the accuracy and the signoff quality of the extraction.

Figure 3A:
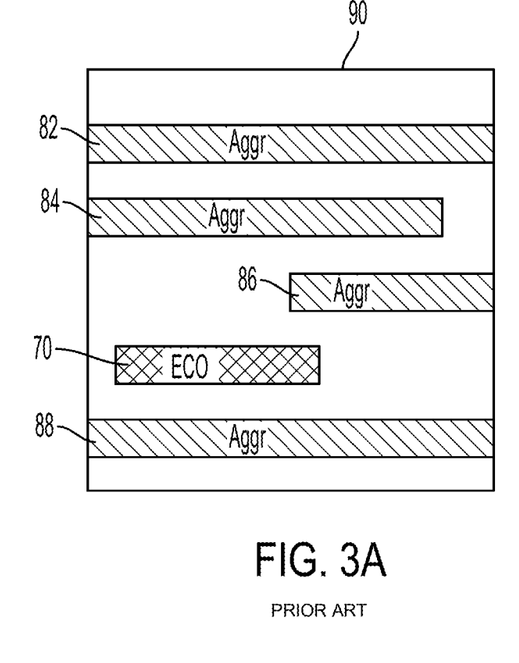
FIG. 3A is a partial layout view of a number of metal interconnects disposed in a layer of an IC layout.
Figure 3B:
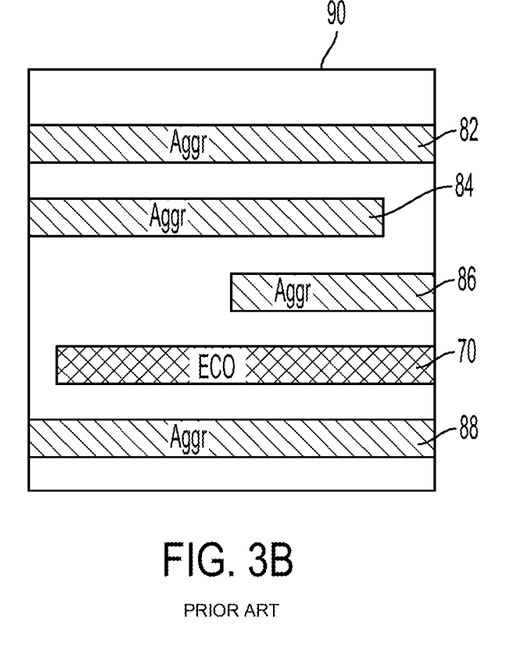
FIG. 3B is a partial layout view of metal interconnects of the layout of FIG. 3A after an increase in the length of one of the ECO nets.

FIG. 3A is a partial layout view of a number of metal interconnects 90 (also referred to herein as nets or metal traces) disposed in a layer of an IC. Net 70 is shown as an ECO net and nets 82, 84, 86 and 88 are identified as aggressor nets. FIG. 3B is a partial layout view of metal interconnects 90 after an increase in the length of ECO net 70 on the same layer.

Due to their proximity, aggressor nets (shown in the Figure as Aggr) 88 and 86 are directly impacted by the change in ECO net 70's length increase and thus experience an increase in their couplings to the ECO net 70. Aggressor net 84 is not directly impacted by the change in length of the ECO net 70, but it is indirectly affected due the second neighbor coupling effect. In other words, aggressor net 84 is affected by aggressor net 86 as a result of the increased coupling between ECO net 70 and aggressor net 86. Second neighbor coupling is smaller than direct coupling so the net change in coupling between ECO net 70 and aggressor net 84 may be negligible. The change in coupling between aggressor net 82 and ECO net 70 is a combination of second and third neighbor coupling and is negligible.

Of the four aggressor nets shown in FIGS. 3A and 3B, aggressor nets 88 and 86 are in the direct line-of-sight of ECO net 70 and thus are impacted the most by the change in the length of ECO net 70. Conventional EDA tools only consider nets that are in the direct line-of-sight of a changed ECO net and thus are unable to account for a relatively high degree of second or higher order intra-layer (i.e., same layer) or inter-layer (i.e., different layer) coupling between the nets.

BRIEF SUMMARY OF THE INVENTION

A computer-implemented method of extracting parasitics associated with a circuit design layout in which the circuit design layout is generated by modifying a previous iteration thereof, includes, in part, identifying a first multitude of nets that have been changed in the circuit design layout relative to the previous iteration thereof, calculating a first multitude of parasitic capacitance values between each of the first multitude of first nets and each of a second multitude of nets disposed in proximity of the first multitude of nets, identifying each net in the second multitude of nets as an aggressor net if a number defined by the net's associated parasitic capacitance value is higher than a threshold value; and excluding nets in the second multitude of second nets that are not identified as aggressor nets from the parasitic extraction.

In some embodiments, the computer-implemented method further includes, in part, determining a second multitude of aggregate parasitic capacitance value differences in accordance with the first multitude of parasitic capacitance values associated with each of the second multitude of nets, and defining the number associated with each net in the second multitude of nets in accordance with the aggregate parasitic capacitance difference associated with the net.

In some embodiments, at least one of the nets in the first multitude of nets is not present in the previous iteration of the circuit design. In some embodiments, at least one of the nets in the first multitude of nets is present in the previous iteration of the circuit design but is not present in the circuit design. In some embodiments, at least one of the nets in the first multitude of nets has a greater length in the circuit design relative to the net's length in the previous iteration of the circuit design. In some embodiments, the computer-implemented method further includes, in part, defining the number associated with each net in the second multitude of nets in accordance with a ratio of the net's aggregate parasitic capacitance difference and the net's total capacitance value.

A computer system, in accordance with one embodiment of the present invention, is configured to extract parasitics associated with a circuit design layout. The circuit layout design layout is generated by modifying its previous iteration. The computer system includes, in part, a processor, and a memory. The memory stores instructions which when executed by the processor cause the processor to identify a first multitude of nets that have been changed in the circuit design layout relative to the previous iteration thereof, calculate a first multitude of parasitic capacitance values between each of the first multitude of first nets and each of a second multitude of nets disposed in neighborhood of the first multitude of nets, identify each net in the second multitude of nets as an aggressor net if a number defined by the net's associated parasitic capacitance value is higher than a threshold value, and exclude nets in the second multitude of second nets that are not identified as aggressor nets from the parasitic extraction.

In one embodiment, the processor is further configured to determine a second multitude of aggregate parasitic capacitance value differences in accordance with the first multitude of parasitic capacitance values associated with each of the second multitude of nets, and define the number associated with each net in the second multitude of nets in accordance with the aggregate parasitic capacitance difference associated with the net.

In one embodiment, at least one of the nets in the first multitude of nets is not present in the previous iteration of the circuit design. In one embodiment, at least one of the nets in the first multitude of nets is present in the previous iteration of the circuit design layout but is not present in the circuit design layout. In one embodiment, at least one of the nets in the first multitude of nets has a greater length in the circuit design relative to the net's length in the previous iteration of the circuit design. In one embodiment, the processor is further configured to define the number associated with each net in the second multitude of nets in accordance with a ratio of the net's aggregate parasitic capacitance difference and the net's total capacitance value.

A sign-off level extractor tool, in accordance with one embodiment of the present invention includes, in part, a first interface to an upstream physical design tool, a second interface to a downstream timing analysis tool activated to perform timing analysis during an ECO design iteration, and a sign-off extractor, coupled to the upstream physical design tool via the first interface and coupled to the downstream timing analysis tool via the second interface. The sign-off extractor is configured to validate a full and incremental extraction flow during an ECO design iteration by controlling a ratio of aggressor nets to ECO nets to maintain a selected level accuracy, and provide for each ECO design iteration, at least one of the full extraction flow or the incremental extraction flow.

In one embodiment, the extraction runtime is linearly dependent on the rate of ECO change. In one embodiment, the sign-off level extraction tool provides at least one of the full extraction flow or the incremental extraction flow to the physical design tool via the first interface. In one embodiment, the sign-off level extraction tool further provides at least one of the full extraction flow or the incremental extraction flow to the timing analysis tool via the second interface.

A method of providing sign-off on a design layout, in accordance with one embodiment of the present invention includes, in part, validating a full and incremental extraction flow during an ECO design iteration by controlling a ratio of aggressor nets to ECO nets to maintain a selected level accuracy, and providing for each ECO design iteration, at least one of the full extraction flow or the incremental extraction flow.

In one embodiment, the extraction runtime is linearly dependent on the rate of ECO change. In one embodiment, the method further includes, in part, providing at least one of the full extraction flow or the incremental extraction flow to an upstream physical design tool. In one embodiment, the method further includes, in part, providing at least one of the full extraction flow or the incremental extraction flow to a downstream timing analysis tool.

DETAILED DESCRIPTION OF THE INVENTION

Embodiments of a computer system, method, a graphical user interface (GUI) and a computer-program product (i.e., software) implementing the parasitic extraction, in accordance with embodiments of the present invention are described below. Such systems, methods, GUI and software (alternatively and collectively referred to herein as systems) may be used to configure and monitor the execution of tasks in a user-configurable electronic-design-automation (EDA) flow associated with a circuit or circuit design. In particular, using an intuitive and interactive graphical user interface in EDA software, the circuit designer can configure and initiate execution of the EDA flow. Then, during execution of EDA tasks in the EDA flow, an execution monitor in the graphical user interface may provide a graphical representation of real-time execution status information for the EDA tasks. Moreover, using the EDA software, the circuit designer can debug the circuit design if any errors or problems occur.

By providing real-time feedback on progress and any problems, such systems may improve, among other things, project visibility, productivity and/or predictability. For example, using such systems, IC designers may design circuits or chips that are manufacturing ready in a single-pass design cycle. Consequently, such systems may make it easier for IC designers to design circuits or chips, which can decrease the time and cost of circuit or chip design, thereby increasing customer satisfaction and retention.

Figure 4:
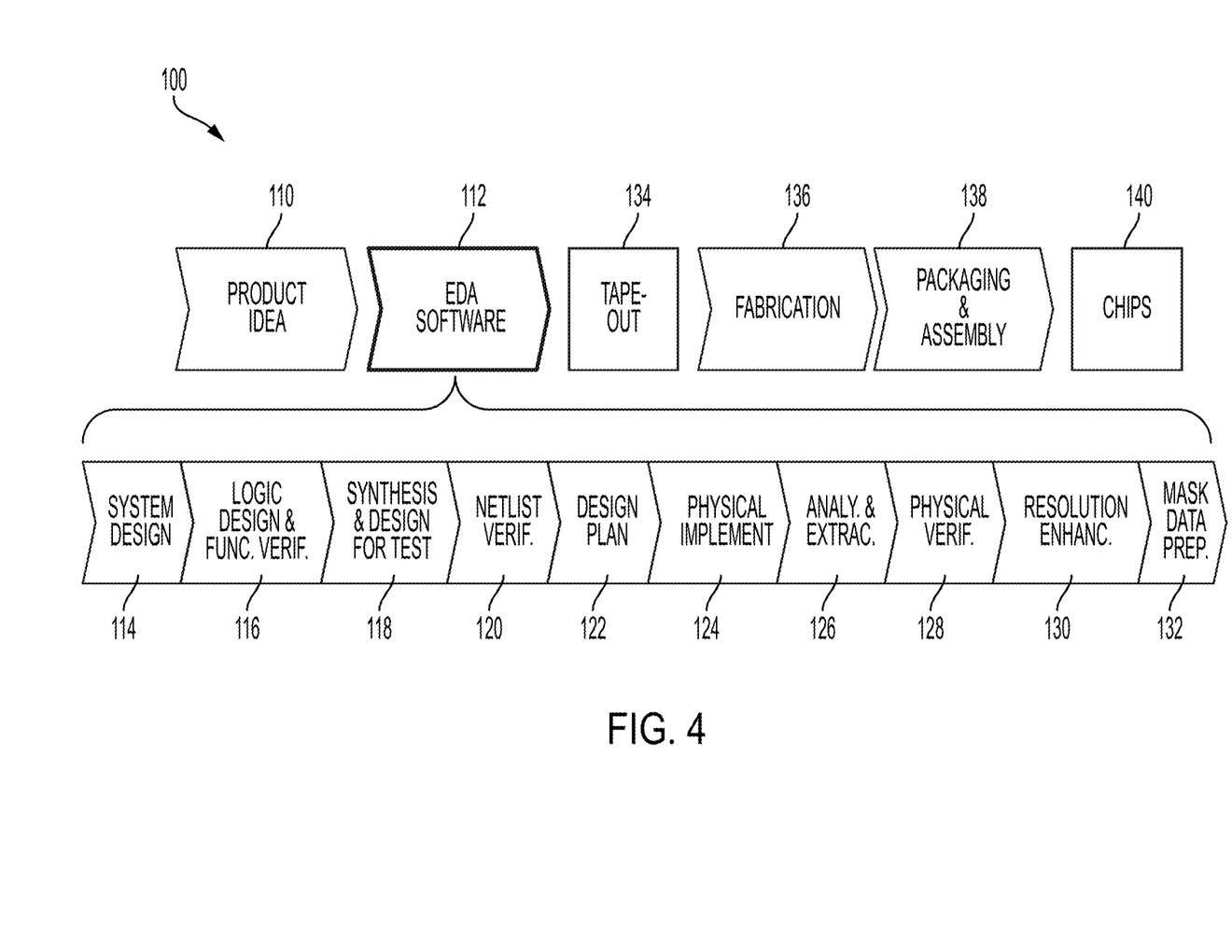
FIG. 4 illustrates the various operations involved in the design and fabrication of an integrated circuit.

FIG. 4 illustrates the various operations 100 involved in the design and fabrication of an integrated circuit. This process is shown as starting with the generation of a product idea 110, which is realized during a design process that uses EDA software 112. When the design is finalized, it can be taped-out at 134. After the tape-out, a semiconductor die is fabricated at 136 and packaging and assembly processes 138 are performed, which ultimately result in finished chips at 140.

The design process that uses EDA software 112 includes operations 114-132, which are described below. This design flow description is for illustration purposes only. In particular, this description is not meant to limit the present disclosure. For example, an integrated circuit design may require a designer to perform the design operations in a different sequence than the sequence described herein.

During system design at 114, a designer describes the functionality to implement. They can also perform what-if planning to refine the functionality and to check costs. Hardware/software architecture partitioning may occur at this stage. Exemplary EDA software products from Synopsys, Inc. of Mountain View, Calif. that can be used at this stage include Model Architect®, Saber, System Studio®, and Designware® products.

During logic design and functional verification 116, VHDL or Verilog code for modules in the circuit is written and the design is checked for functional accuracy. More specifically, the design is checked to ensure that it generates correct outputs. Exemplary EDA software products from Synopsys, Inc. of Mountain View, Calif. that can be used at this stage include VCS®, Vera®, Designware®, Magellan®, Formality®, ESP® and Leda® products.

During synthesis and design for test 118, the VHDL/Verilog source code is transformed to a netlist that may be optimized for the target technology. Additionally, tests can be designed and implemented to check the finished chips. Exemplary EDA software products from Synopsys, Inc. of Mountain View, Calif. that may be used at this stage include Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Exemplary EDA software products from Synopsys, Inc. of Mountain View, Calif. that may be used at this stage include Formality Primetime®, and VCS® products.

During design planning 122, an overall floor plan for the chip is constructed and analyzed for timing and top-level routing. Exemplary EDA software products from Synopsys, Inc. of Mountain View, Calif. that may be used at this stage include Astro® and IC Compiler® products.

During physical implementation 124, the placement (positioning of circuit elements) and routing (connection of the same) occurs. Exemplary EDA software products from Synopsys, Inc. of Mountain View, Calif. that can be used at this stage include the Astro® and IC Compiler® products.

During analysis and extraction 126, the circuit operation is verified at a transistor level enabling refinement. Exemplary EDA software products from Synopsys, Inc. of Mountain View, Calif. that may be used at this stage include Astrorail®, Primerail®, Primetime®, and Star RC/XT® products.

Next, during physical verification (128), the design is checked to ensure correctness for: manufacturing, electrical issues, lithographic issues, and circuitry. Exemplary EDA software products from Synopsys, Inc. of Mountain View, Calif. that can be used at this stage include the Hercules® product.

During resolution enhancement 130, geometric manipulations of the layout are performed to improve manufacturability of the design. Exemplary EDA software products from Synopsys, Inc. of Mountain View, Calif. that may be used at this stage include: Proteus®, Proteus® AF, and PSMGED® products.

During mask-data preparation 132, the tape-out data for production of masks to produce finished chips is provided. Exemplary EDA software products from Synopsys, Inc. of Mountain View, Calif. that may be used at this stage include the CATS® family of products.

Embodiments of the present invention may be used during one or more of the above-described stages. Specifically, in some embodiments the present invention may be used in EDA software that includes operations between design 114 and resolution enhancement 130.

A parasitic extraction EDA tool, in accordance with one embodiment of the present invention, is adapted to perform incremental extraction that maximizes the runtime benefit with negligible loss in accuracy. Improved extraction performance in later iterations of the design process minimizes the turnaround time and reduces time pressure in the critical stages leading up to what is commonly referred to as tape-out. A parasitic extraction EDA tool, in accordance with embodiments of the present invention, concurrently satisfies the accuracy and runtime requirements of signoff incremental extraction.

A parasitic extraction EDA tool, in accordance with one embodiment of the present invention, accounts for relatively high degree of second or higher order intra-layer (i.e., same layer) or inter-layer (i.e., different layer) coupling between nets disposed in the vicinity or neighborhood of an ECO net. The EDA tool is further adapted to reject from consideration aggressor nets that are directly coupled to ECO nets but have experienced changes in their parasitic coupling less than a minimum threshold value. To achieve this, the tool uses a technique that results in minimal accuracy impact while maximizing the runtime benefit. The circuit-based technique provides a number of advantages over conventional geometric-based solutions by identifying a relatively smaller set of nets targeted for extraction. The circuit-based technique, in accordance with embodiments of the present invention, uses circuit information from previous iterations, thereby eliminating the need to extract nets whose circuit properties change relatively negligibly across iterations in the design process.

Embodiments of the present invention use a circuit-based technique to identify aggressor nets for extraction. An aggressor net is understood herein to refer to the entire net or to the portion of the net in the region of the layout near the ECO net. Embodiments of the present invention exclude from consideration changes to aggressor nets for which the effect of an ECO net change on their electrical properties, such as capacitance, resistance, and inductance, is less than a threshold value.

When performing an incremental extraction, information regarding a reference or baseline topology and circuit netlist associated with the previous iteration of the design process is present. Embodiments of the present invention use this information to facilitate the identification of aggressor nets in a current iteration of incremental extraction. The previous circuit netlist is compared to the current topology to determine the extent of physical changes and identify the ECO nets that need to be extracted. The previous iteration of circuit netlist, which has a description of the resistance, capacitances, and inductances of all nets including their electrical interactions with other nets, may also be used to carry out the current iteration's incremental extraction. The following description of the exemplary embodiments of the present invention are made with reference to extracting parasitic capacitances, which are most sensitive to topological change. It is understood, however, that embodiments of the present invention are equally applicable to extracting parasitic resistances and inductances.

Figure 5:
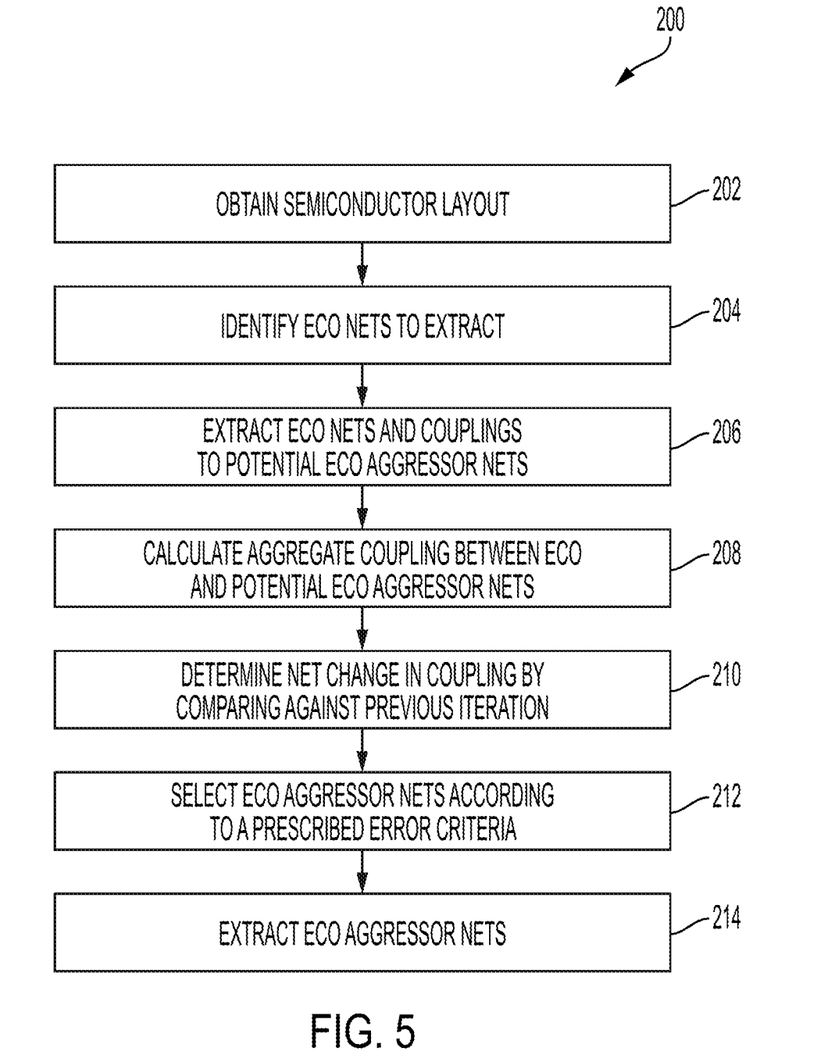
FIG. 5 is a flowchart for performing incremental parasitic extraction, in accordance with one embodiment of the present invention.

FIG. 5 is a flowchart 200 for performing incremental parasitic extraction, in accordance with one embodiment of the present invention. At 202 the semiconductor layout is imported to the incremental parasitic extraction tool. At 204, using the information included either in the layout or an external file, the ECO nets that are to be extracted are identified. At 206, the ECO nets so identified are extracted and the values of the parasitic couplings between the extracted ECO nets and a list of potential aggressor nets are determined. The list of potential aggressor nets includes aggressor nets and placeholder nets. Placeholder nets are defined as nets that are coupled to identified ECO nets but have parasitic couplings that are either unchanged or are minimally changed. As such, placeholder nets are designated as not requiring extraction.

Thereafter, at 208, an aggregate coupling is computed between each ECO net and each potential aggressor net. A similar aggregate coupling is computed using the parasitic network from the previous iteration. If an ECO net is present in the current iteration of the circuit netlist but not in previous netlist (i.e., the ECO net was added to the previous netlist to generate the current enlist) then no coupling to such an ECO net will be present in the previous network, thus resulting in a coupling value of zero for such an ECO net associated with the previous netlist. Conversely, if a net was present in the previous netlist but not in the current netlist iteration (i.e., the ECO net was deleted from the previous netlist to generate the current netlist), then no coupling to such an ECO net will be present in the current netlist, thus resulting in a coupling value of zero for such an ECO net in the current netlist. Aggregate coupling values are computed for the previous network. At 210, differences (i.e., net increase or decrease) in the coupling values between each ECO net and each potential aggressor nets associated with the current and previous iterations of netlists are obtained.

At 212 a selection criterion is used to identify each potential aggressor net as either an aggressor net or a placeholder net. The criterion used for selecting aggressor nets may be based upon maintaining a desired level of accuracy in any combination of parasitics, timing, and power domains. Using the parasitics domain for the selection criteria, an aggressor net may be identified as a net whose absolute sum of differences in the aggregate coupling exceeds a predefined percentage of the net's total capacitance. Once the aggressor nets are identified, at 214 a second extraction is carried out on only the aggressor nets so identified. The placeholder nets, which were initially identified as potential aggressor nets but are subsequently determined not to be as aggressor nets, are excluded from this extraction. By excluding placeholder nets so identified or determined from extraction, in accordance with embodiments of the present invention, extraction overhead is minimized without significantly affecting overall accuracy. The level of sign-off quality accuracy is maintained by using a conservative aggressor selection criteria.

Figure 6A:
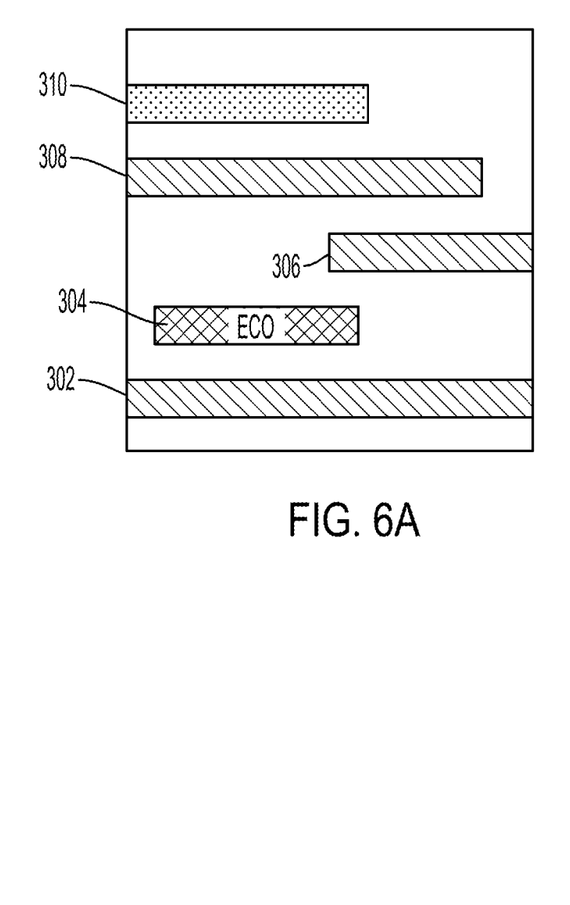
FIG. 6A shows a number of nets extracted from a previous iteration of an exemplary circuit netlist, in accordance with one embodiment of the present invention.
Figure 6B:
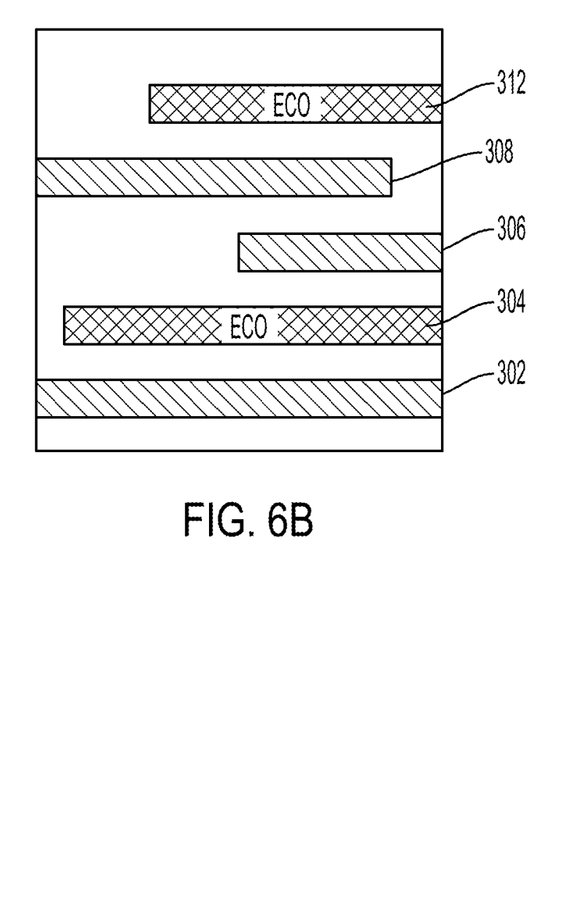
FIG. 6B shows a number of nets extracted from a current iteration of the circuit netlist of FIG. 6A.

FIG. 6A shows a number of nets extracted from a previous iteration of an exemplary circuit netlist. In FIG. 6A, nets 302, 306 and 308 are identified as potential aggressor nets, and net 304 is identified as an ECO net. Net 510 is also shown in FIG. 6A. FIG. 6B shows the nets extracted from a current iteration of the circuit netlist of FIG. 6A. As is readily seen, to generate the nets shown in FIG. 6B from FIG. 6A, net 310 is deleted, ECO net 312 is added and the length of ECO net 304 is increased. The remaining nets 302, 306 and 308 are not changed.

Table I Below shows the changes in the parasitic capacitive coupling between each of potential aggressor nets 302, 306 and 308 on the one hand, and ECO nets 304, 312 and deleted net 310 on the other. It is understood that, for simplicity, second nearest-neighbor couplings are not shown. Also, assuming that second nearest-neighbor couplings are excluded, the coupling between aggressor net 309 and ECO net 308 does not change.

TABLE I

| Aggressor Net | ECO or deleted Net | Change in Capacitive coupling |
| --- | --- | --- |
| 302 | 304 | +0.5 |
| 306 | 304 | +0.5 |
| 308 | 312 | +0.3 |
| 306 | 312 | +0.1 |
| 308 | 310 | −0.4 |

Capacitive coupling increases if the ECO net length increases, and decreases if a net is deleted or the ECO net length decreases. In the example above, for simplicity, only the capacitive coupling between immediate neighboring nets (such as nets 304 and 302—referred to herein as first-order neighboring nets) or nets that are separated from on another by their immediate neighboring nets (such as nets 306 and 312—referred to herein as second-order neighboring nets) are calculated. However, it is understood, that in other embodiments, nets that may be separated from one another by two or more nets (i.e., high-order neighboring nets) may be used in calculating changes in capacitive coupling.

The absolute value of the sum of coupling changes for each potential aggressor net is shown below:
Net 302: 0.5 fF
Net 306: |0.5 fF|+|0.1 fF|=0.6 fF
Net 308: |0.3 fF|+|−0.4 fF|=0.7 fF The ratio of total change in coupling vs. total net capacitance is subsequently computed for each such net. Assuming total capacitance values of 42 fF, 25 fF, and 10 fF, for nets 302, 306, and 308, respectively, these ratio are:
Net 302: 0.5/42=0.012
Net 306: 0.6/25=0.024
Net 308: 0.7/10=0.07

Assume that any potential aggressor net with such a ratio greater than a predefined value of 0.02 is identified as an aggressor net. Accordingly, for the above example, potential aggressor nets 306 and 308 are considered as aggressor nets, and potential aggressor net 301 is considered a placeholder net and is thus excluded from further extraction.

Table II below shows the decrease in number of aggressor nets as well as improvement in the extraction runtime for four different designs A, B, C and D when the aggressor net identification is performed using a circuit-based incremental extraction, in accordance with embodiments of the present invention, compared to a conventional topological based technique.

TABLE II

| Design | ECO Percentage | Decrease in Number of Aggressor Nets | Extraction Run Time Improvement |
| --- | --- | --- | --- |
| A | <0.01% | 300X | 1.8X |
| B | 0.3% | 90X | 2.5X |
| C | 0.8% | 13X | 9.1X |
| D | 0.9% | 330X | 12.6X |

Designs A, B, C and D are shown as having varying degrees of ECO changes. As is seen from Table II, compared to a conventional topological-based approach, embodiments of the present invention achieve reduction factors of 300, 90, 13 and 330 respectively in aggressor net identification, and improvement factors of 1.8, 2.5, 9.1 and 12.6 in extraction runtime.

Embodiments of the present invention advantageously enable the ratio of aggressor nets to ECO nets to be well-controlled. In one example, the range for such a ratio may be between 0.5 and 2.0. Maintaining this ratio substantially close to 1.0 is important in ensuring that the extraction runtime remains linearly dependent on the rate of ECO change. In addition to the significantly enhanced performance characteristics of the circuit-based extraction, in accordance with embodiments of the present invention, the performance accuracy is also well within the requirements of a signoff-based extractor. The simplicity together with effectiveness of a circuit-based extraction, in accordance with embodiments of the present invention, makes it possible for a signoff-level extraction tool to maintain its signoff level accuracy while providing a runtime benefit that justifies the overhead of validating and maintaining both full and incremental extraction flows that interface with both upstream physical design tools and downstream timing analysis tools during an ECO design iteration.

Figure 7:
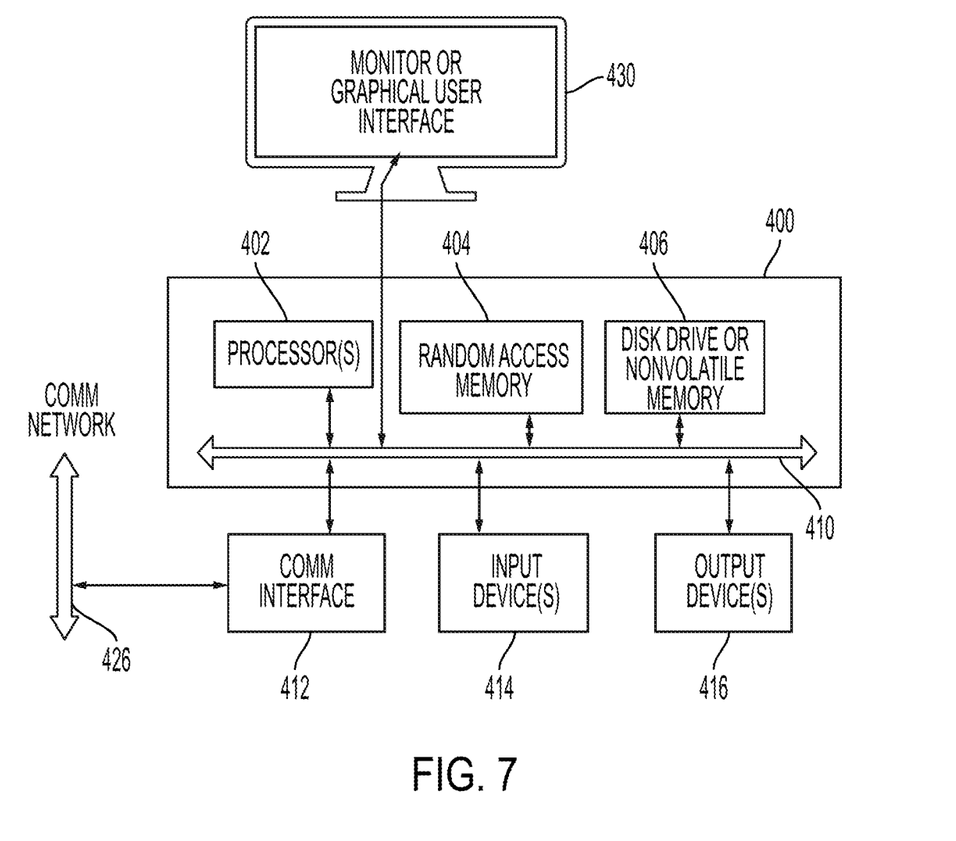
FIG. 7 is a schematic block diagram of a computer system 700 configured to perform incremental extraction, in accordance with one embodiments of the present invention.

FIG. 7 is a schematic block diagram of a computer system 700 configured to implement embodiments of the present invention. It will be readily apparent to one of ordinary skill in the art that many other hardware and software configurations are suitable for use with embodiments of the present invention. For example, the computer may be a desktop, portable, rack-mounted or tablet configuration. Additionally, the computer may be a series of networked computers.

Computer system 400 is shown as including, in part, one or more processors 402, one or more random access memories 404, and a disk drive or non-volatile memory 406.

Processor 402, random access memory 404, and disk drive (or non-volatile memory) 406 are configured to communicate with one another as well as with communication interface 412, input devices 414 and output devices 416 via bus lines 410. Computer system 400 is further configured to communication with other devices (not shown) via communication network 420 and communication interface 412.

Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the descriptions provided herein, a person of ordinary skill in the art will understand other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatus.

The above descriptions of embodiments of the present invention are illustrative and not limitative. Other modifications and variations will be apparent to those skilled in the art and are intended to fall within the scope of the appended claims.

What is claimed is:

1. A computer-implemented method of extracting parasitics associated with a circuit design layout, said circuit design being generated by modifying a previous iteration thereof, the method comprising:
   identifying a first plurality of nets that have been changed in the circuit design layout relative to the previous iteration thereof;
   calculating a first plurality of parasitic capacitance values between each of the first plurality of first nets and each of a second plurality of nets disposed in proximity of the first plurality of nets;
   identifying each net in the second plurality of nets as an aggressor net if a number defined by the net's associated parasitic capacitance value is higher than a threshold value; and
   excluding nets in the second plurality of second nets that are not identified as aggressor nets from the parasitic extraction; and
   analyzing the design of the circuit in accordance with the first plurality of parasitic capacitance values.

2. The computer-implemented method of claim 1 further comprising:
   determining a second plurality of aggregate parasitic capacitance value differences in accordance with the first plurality of parasitic capacitance values associated with each of the second plurality of nets; and
   defining the number associated with each net in the second plurality of nets in accordance with the aggregate parasitic capacitance difference associated with the net.

3. The computer-implemented method of claim 2 wherein at least one of the nets in the first plurality of nets is not present in the previous iteration of the circuit design.

4. The computer-implemented method of claim 2 wherein at least one of the nets in the first plurality of nets is present in the previous iteration of the circuit design but is not present in the circuit design.

5. The computer-implemented method of claim 2 wherein at least one of the nets in the first plurality of nets has a greater length in the circuit design relative to the net's length in the previous iteration of the circuit design.

6. The computer-implemented method of claim 2 further comprising:
   defining the number associated with each net in the second plurality of nets in accordance with a ratio of the net's aggregate parasitic capacitance difference and the net's total capacitance value.

7. A computer system configured to extract parasitics associated with a circuit design layout, said circuit design layout being generated by modifying a previous iteration thereof, the computer system comprising:
   a processor; and
   a memory comprising instructions which when executed by the processor cause the processor to:
   identify a first plurality of nets that have been changed in the circuit design layout relative to the previous iteration thereof;
   calculate a first plurality of parasitic capacitance values between each of the first plurality of first nets and each of a second plurality of nets disposed in neighborhood of the first plurality of nets;
   identify each net in the second plurality of nets as an aggressor net if a number defined by the net's associated parasitic capacitance value is higher than a threshold value; and
   exclude nets in the second plurality of second nets that are not identified as aggressor nets from the parasitic extraction.

8. The computer system of claim 7 wherein said processor is further configured to:
   determine a second plurality of aggregate parasitic capacitance value differences in accordance with the first plurality of parasitic capacitance values associated with each of the second plurality of nets; and
   define the number associated with each net in the second plurality of nets in accordance with the aggregate parasitic capacitance difference associated with the net.

9. The computer system of claim 8 wherein at least one of the nets in the first plurality of nets is not present in the previous iteration of the circuit design.

10. The computer system of claim 8 wherein at least one of the nets in the first plurality of nets is present in the previous iteration of the circuit design layout but is not present in the circuit design layout.

11. The computer system of claim 8 wherein at least one of the nets in the first plurality of nets has a greater length in the circuit design relative to the net's length in the previous iteration of the circuit design.

12. The computer system of claim 8 wherein the processor is further configured to:
   define the number associated with each net in the second plurality of nets in accordance with a ratio of the net's aggregate parasitic capacitance difference and the net's total capacitance value.

\* \* \* \* \*